US006970828B2

(12) United States Patent
Castellani et al.

(10) Patent No.: US 6,970,828 B2
(45) Date of Patent: Nov. 29, 2005

(54) METHOD FOR MIXED HUMAN AND COMPUTER-SUPPORTED DISTRIBUTED SCHEDULING

(75) Inventors: Stefania Castellani, Meylan (FR); Maria Antonietta Grasso, Grenoble (FR)

(73) Assignee: Xerox Corporation, Stamford, CT (US)

( * ) Notice: Subject to any disclaimer, the term of this patent is extended or adjusted under 35 U.S.C. 154(b) by 886 days.

(21) Appl. No.: 09/738,988

(22) Filed: Dec. 19, 2000

(65) Prior Publication Data

US 2002/0077878 A1 Jun. 20, 2002

(51) Int. Cl.[7] .............................................. G06F 17/60
(52) U.S. Cl. ................................................ 705/8; 705/9
(58) Field of Search ............................. 705/8; 709/100, 709/101, 102

(56) References Cited

U.S. PATENT DOCUMENTS

| | | | | | |
|---|---|---|---|---|---|
| 4,853,495 | A | * | 8/1989 | Ouchi et al. | 178/18.03 |
| RE34,476 | E | * | 12/1993 | Norwood | 382/186 |
| 5,287,194 | A | * | 2/1994 | Lobiondo | 358/296 |
| 5,329,444 | A | * | 7/1994 | Takahashi et al. | 705/8 |
| 5,485,565 | A | | 1/1996 | Saund et al. | 395/142 |
| 5,528,290 | A | | 6/1996 | Saund | 348/218 |
| 5,581,637 | A | | 12/1996 | Cass et al. | 382/284 |
| 6,005,482 | A | | 12/1999 | Moran et al. | 340/568.8 |

FOREIGN PATENT DOCUMENTS

| | | | | | |
|---|---|---|---|---|---|
| JP | | 09153092 | * | 6/1997 | G06F/17/60 |

OTHER PUBLICATIONS

Mishina, Mayu. "The New Face of Scheduling". American Printer. Chicago: Mar. 2000. vol. 224, Iss. 6.*
Castellani, S., Meunier, J.L., Andreoli, J.M., Fernstrom, C.; "Scheduling, Negotiation and Decision Making in Distributed Organizations Process Management"; XRCE Grenoble report, 1998.
Castellani, S., Meunier, J.L., Andreoli, J.M., and Fernström, C.; "Workflow Management for the Distributed Printshops", XRCE Grenoble report, 1998.
Moran, T., Saund, E., Van Melle, W., Gujar, A. U., Fishkin, K. P., and Harrison, B. L., "Design and Technology for Collaborage: Collaborative Collages of Information on Physical Walls", in Proceedings of CHI'99, 1999.
Moran, T., Van Melle, W., and Chiu, P., "Spatial Interpretation of Domain Objects Integrated into a Freeform Electronic Whiteboard", in Proceedings of UIST'98, 1998.
Moran, T., Van Melle, W., and Chiu, P., "Tailorable Domain Objects as meeting Tools for an Electronic Whiteboard", in Proceeding of CSCW'98, 1998.
Saund, E, "Bringing the Marks on a Whiteboard to Electronic Life", in Proc. of CoBuild'99, 1999.
Streitz, N., A., Geissler, J., Holmer, T.; "Roomware for Cooperative Buildings: Integrated Design of Architectural Spaces and Information Spaces"; In N. Streitz, S. Konomi, H. Burkhardt (Eds.), Cooperative Buildings—Integrating Information, Organization, and Architecture. Proceedings of CoBuild98, Darmstadt, Germany. Lecture Notes in Computer Science, vol. 1370. Springer: Heidelberg, 1998, pp. 4–21.

* cited by examiner

*Primary Examiner*—Tariq R. Hafiz
*Assistant Examiner*—Johnna Stimpak

(57) ABSTRACT

The present invention provides a method to support the coordination of geographically distributed activities, e.g. printing and, in particular, a method for mixed human and computer-supported distributed scheduling of a task according to scheduling decisions within a plurality of workplaces. The workplaces are connected to each other and to a shared negotiation facility via a computer network. The method involves expressing a first scheduling decision by manual modification in a scheduling board within a first of said workplaces, recording said first scheduling decision and creating computer-readable first scheduling decision data. These first scheduling decision data are transferred via the computer network to the shared negotiation facility, where said task is negotiated by combining the first scheduling decision data with second scheduling decision data received from at least a second of said workplaces. Negotiation results are transferred to at least said first workplace.

20 Claims, 5 Drawing Sheets

METHOD FOR MIXED HUMAN AND COMPUTER-SUPPORTED DISTRIBUTED SCHEDULING

BACKGROUND OF THE INVENTION

1. Field of the Invention

The present invention generally relates to task scheduling across (possibly geographically) distributed workplaces and in particular to a method for mixing human and computer-supported initiative in distributed scheduling.

In the invention, a distributed document production setting is used as an example scenario to describe the approach, but the scenario could be generalized to be any distributed setting wherever scheduling activities occur to manage tasks in workplaces.

In the distributed document production example, this invention presents a method for decision-makers in a printshop to negotiate and transmit print job data to other printshops for off-site production or to receive print jobs from other printshops when operating below capacity.

2. Description of the Related Art

Users often reject planning and scheduling tools because they are not adapted to the actual work practices or are perceived as totally disruptive even if the users are very interested in the functionality they are provided with. For example, printshop decision-makers, who are working on the job schedule have to provide electronic scheduling information in order to receive an automated support when negotiating jobs across remote printshops. However, if they are used to work with collaborators on a whiteboard, they are reluctant to change this practice for adapting a fully computer-supported scheduler.

Most computer based automatic scheduling systems have the drawback that they do not support the currently used representation of production schedules and scheduling decisions.

As described in Moran, T., Saund, E., van Melle, W., Gujar, A. U., Fishkin, K. P., Harrison, B. L.: "Design and Technology for Collaborage: Collaborative Collages of Information on Physical Walls", in: Proc. of UIST'99, 1999, and Saund, E: "Bringing the Marks on a Whiteboard to Electronic Life", in Proc. of CoBuild'99, 1999, there has been designed and implemented an architecture for physically representing information on a board and connecting it with electronic information. The connection is achieved by tracking the board and applying image analysis techniques on it. These systems provide the possibility to describe tasks on a wall representation or provide features for whiteboard writing and selective command specification on parts of the board.

An example for usage of large screen displays to support collaboration is the Dyna Wall described in Strietz, N., Geissler, J., Holmer, T.: "Roomware for Cooperative Buildings: Integrated Design of Architectural Spaces and Information Spaces", in: Strietz, N., Konomi, S., Burkhardt, H. (Eds.), Cooperative Buildings—Integrating Information, Organization, and Architecture. Proc. of CoBuild98, Darmstadt, Germany. Lecture Notes in Computer Science, Vol. 1370, Springer, Heidelberg, 1998, pp. 4–21. Dyna Wall is a large screen display with an active area of 4.5×1.1 meters and a resolution of 3072×768 pixels. It is formed by three networked, back-projected electronic whiteboards each with its own controlling personal computer. User interaction is by hand-gesture and pen input. The implementers have developed a number of interaction techniques for manipulating objects on the display. The intent of this device is to support collaborative working, apparently using applications similar to those found on standard two-dimensional graphical user interfaces.

Other wall editing technologies are described in U.S. Pat. Nos.: 5,485,565; 5,528,290; 6,005,482; and 5,581,637, which are incorporated herein by reference. Additional wall editing technologies are described by in Moran, T., van Melle, W., Chiu, P., "Spatial Interpretation of Domain Objects Integrated into a Freeform Electronic Whiteboard", in: Proc. of UIST '98, 1998, and in Moran, T., van Melle, W., Chiu, P., "Tailorable Domain Objects as Meeting Tools for an Electronic Whiteboard", in: Proc. of CSCW '98,1998, which are also incorporated herein by reference.

All these systems for electronic representation of manually applied information on a board do not provide any architecture for supporting distributed scheduling.

SUMMARY OF THE INVENTION

The present invention has been made in consideration of the above situation and has its primary object to enhance the efficiency of distributed scheduling, e.g. in DDP.

This and other objects of the present will become apparent hereinafter.

To achieve these objects, the present invention provides a novel architecture and a novel protocol enabling a mixed human and computer-supported initiative for distributed scheduling. More precisely, the invention provides a method allowing:

a) Users to express scheduling decisions by manual selection of scheduling information;

b) Translation of scheduling information into negotiation information;

c) Activation of task negotiation across distributed sites; and d) Translation of negotiation information into scheduling information.

The proposed new architecture comprises three facilities: a manual scheduling board, a recorder facility and a negotiation facility. According to the protocol proposed in this invention, users use a manual scheduling board to manage their planning/scheduling activities within a printshop. When the users make decisions e.g. outsourcing a print job, the scheduling board will allow to manually express those decisions. A recorder facility will recognize the scheduling decisions and translate them into negotiation information. The negotiation information will be used by a negotiation facility to manage negotiation with other work places. Finally, the negotiation facility will provide the results of the negotiations, if any, that will be presented to the users.

The solution presented in this invention therefore enables distributed scheduling allowing users to keep on working with the support they are familiar with.

BRIEF DESCRIPTION OF THE DRAWINGS

The accompanying drawings are incorporated into and form a part of the specification to illustrate several embodiments of the present invention. These drawings, together with the description, serve to explain the principles of the invention. The drawings are only for the purpose of illustrating preferred and alternative examples of how the invention can be made and used and are not to be construed as limiting the invention to only the illustrated and described embodiments. Further features and advantages will become apparent from the following and more particular description of the various embodiments of the invention, as illustrated in the accompanying drawings, wherein.

DETAILED DESCRIPTION

The illustrated embodiments of the present invention will now be described with reference to the figure drawings.

Figure 1:
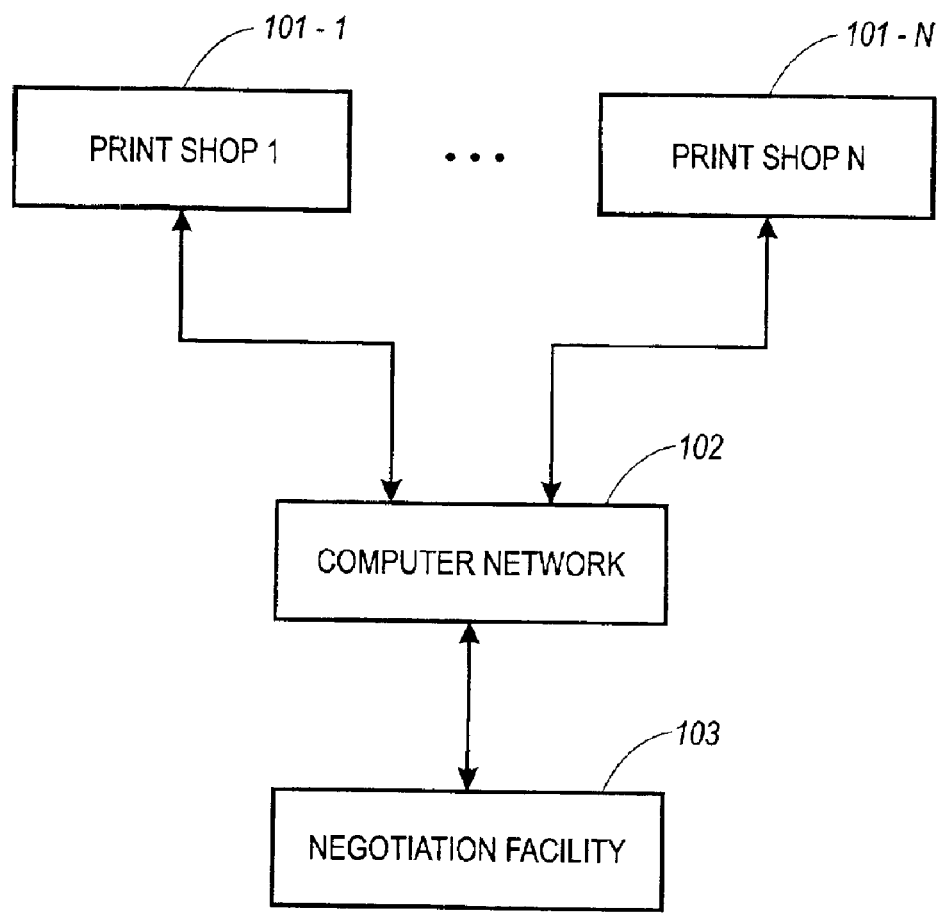
FIG. 1 illustrates a system of multiple printshops which are connected via a computer network to a negotiation facility.

Referring now to the drawings and particularly to FIG. 1 which illustrates a preferred embodiment of a system of multiple printshops which are connected via a computer network to a negotiation facility, there are provided several printshops 101-1 to 101-N which are connected to each other and to a negotiation facility 103 via a computer network 102. The computer network 102 enables the exchange of data between each printshop 101-1 to 101-N and the negotiation facility 103 as well as from one printshop to another. Each one of the printshops 101-1 to 101-N is an autonomous work place offering similar and/or complementary competencies and capabilities. Each printshop collaborates, but also competes with other printshops to improve its own ability to accomplish customer requests. Moreover, each printshop 101-1 to 101-N is to a great extent or completely responsible for managing its schedule.

Figure 2:
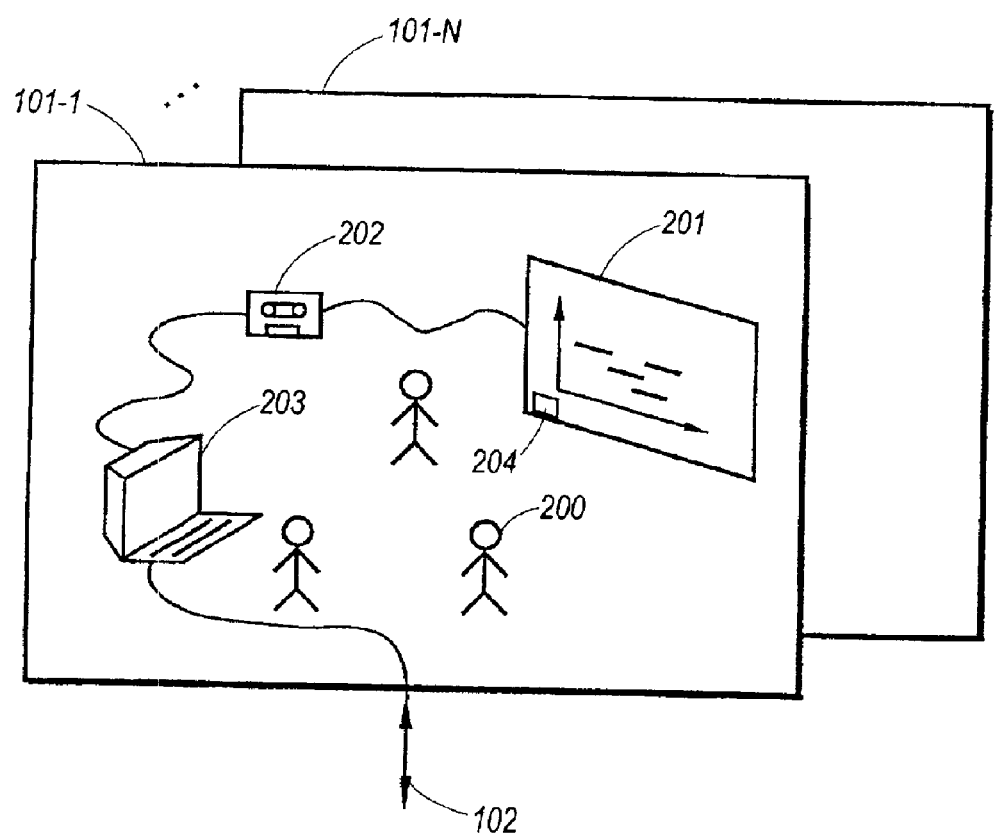
FIG. 2 shows the architecture of one particular printshop.

Turning now to FIG. 2, which illustrates the components within each printshop 101-1 to 101-N, the architecture and the functionality of the present invention can be explained in more detail.

In each printshop 101-1 to 101-N, users 200 use a manual scheduling board 201 to manage their planning/scheduling activities. The manual scheduling board 201 can range from being totally non-electronic (e.g. a whiteboard) through to totally electronic (e.g. a large screen display). The planning/scheduling can be represented in several ways. One possible representation of the schedule shown by the manual scheduling board 201 could be a Gantt chart with the printshop machines along one dimension and the time units along the other dimension. Users 200 allocate print jobs trying to optimize the workload of the machines and respecting the time constraints. Print jobs may be represented as rectangles whose length is proportional to the estimated duration of the job on a given printer machine. Additionally, unallocated print jobs can be listed on the manual scheduling board 201, outside the Gantt chart.

Figure 3A:
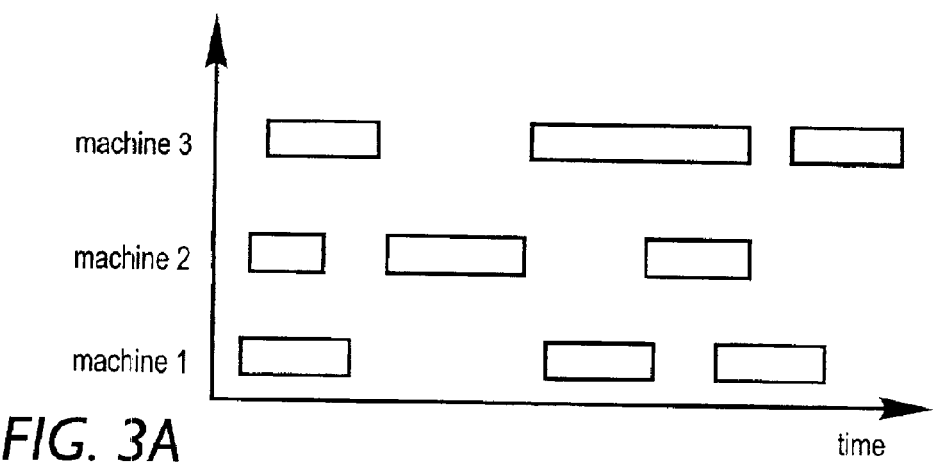
FIGS. 3A–3C show three examples of a printshop schedule before and after certain scheduling decisions have been marked.

FIG. 3A shows an example of a schedule, with several print jobs allocated to machine 1, machine 2, and machine 3. From time to time the decision-maker may decide to insource a print job from another printshop, using a free time slot on a given machine, or to outsource a given print job (part of the Gantt chart or of the unallocated jobs' list) to another printshop. These decisions will be based upon information on the current jobs schedule and the printshops technical capabilities.

Figure 3B:
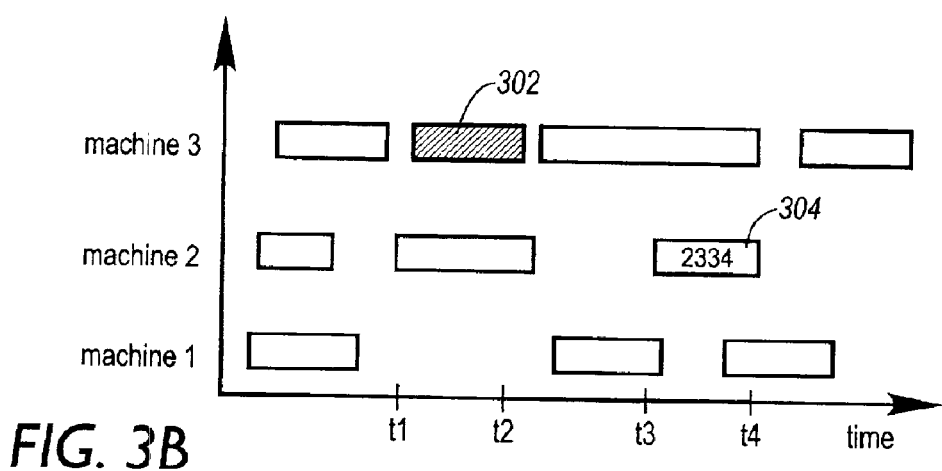

For example, in the schedule of FIG. 3B the shaded rectangle between t1 and t2 represents and idle period for machine 3. Thus, the decision-maker may try to find a job to be allocated on machine 3 for a time slot between t1 and t2. On the other hand, the decision-maker may try to outsource the job having the identifier (ID) 2334 allocated to machine 2 between t3 and t4, thus freeing the corresponding time slot for using it in a different way.

Other representations are possible for the schedule. For example, there could be two charts: one for the jobs to outsource and one for the time slots to insource. In any case, the scheduling board 201 will allow the user to select information and describe related decisions (task in-sourcing using free time slots and task outsourcing).

Referring back to FIG. 2, a recorder facility 202 will capture and record the information selected by the decision-maker recognizing a free time slot to be subcontracted when delimited by an insource shape, e.g. a rectangle, and marked by an insource mark, e.g. a checker, and a job denoted by an identifier, to be outsourced when marked by an outsource mark, e.g. an asterisk.

Figure 3C:
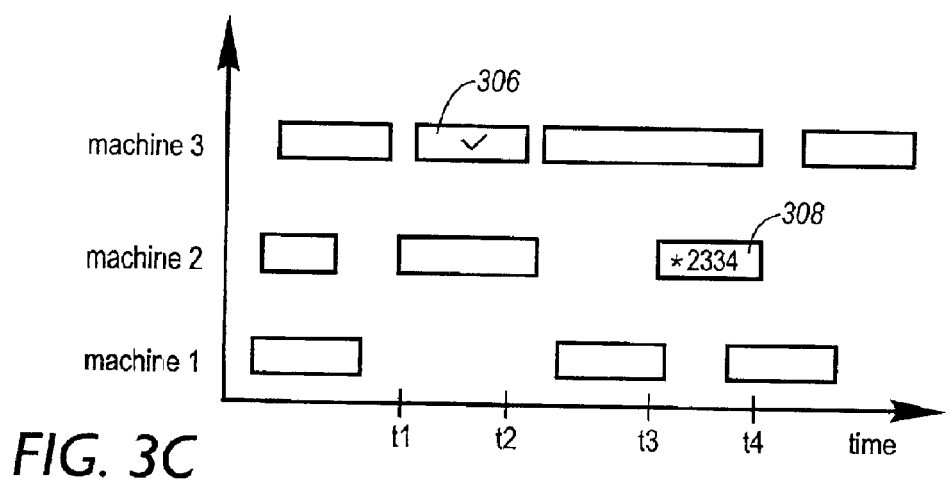

FIG. 3C shows an example of insource 306 and outsource 308 marks.

Also, the user 200 could annotate a job or a free time slot with some further information. For example, for a given job, a decision-maker could specify the name of a printshop likeable to accept the job. The recorder facility 202 will collect time information that combined with the electronic description of the jobs (e.g. deadlines, paper quality etc.) and/or with the electronic description of the technical capabilities of the printshop will define the negotiation information.

A negotiation facility 103 will use the negotiation information for managing negotiations with other printshops within an alliance. It will allow a decision-maker from a particular printshop within the alliance to publish selected scheduling information local to the workplace and to import selected scheduling information published by other workplaces. The negotiation facility will start negotiations for outsourcing and in-sourcing work items with other printshops. For each negotiation the negotiation facility 103 will collect answers from the printshops 101-1 to 101-N and select possible solutions, if any. According to the solutions found, the decision-maker will transfer the outsourced print job to the accepting printshop indicated by the negotiation facility or will receive the insourced print job from the offering printshop identified by the negotiation facility. This procedure can also be performed automatically. A number of negotiation schemes among negotiation facilities can be adopted. In one embodiment, the solutions found by the negotiation facility are displayed on a computer workstation 203 at the accepting printshop.

To summarize, annotated on the manual scheduling board 201 are free time slots and/or print jobs, either of which may be published to the negotiation facility 103 if they contain a control mark. A free time slot that is published is in effect a request for in-sourcing work. A print job that is published is in effect a request for outsourcing work. Special symbols or control marks (i.e., activation signs) identified by the recorder facility 202 are used to identify whether to publish free time slots or print jobs. Other free time slots and print jobs annotated on the manual scheduling board 201 are not published to the recorder facility 202.

Figure 4:
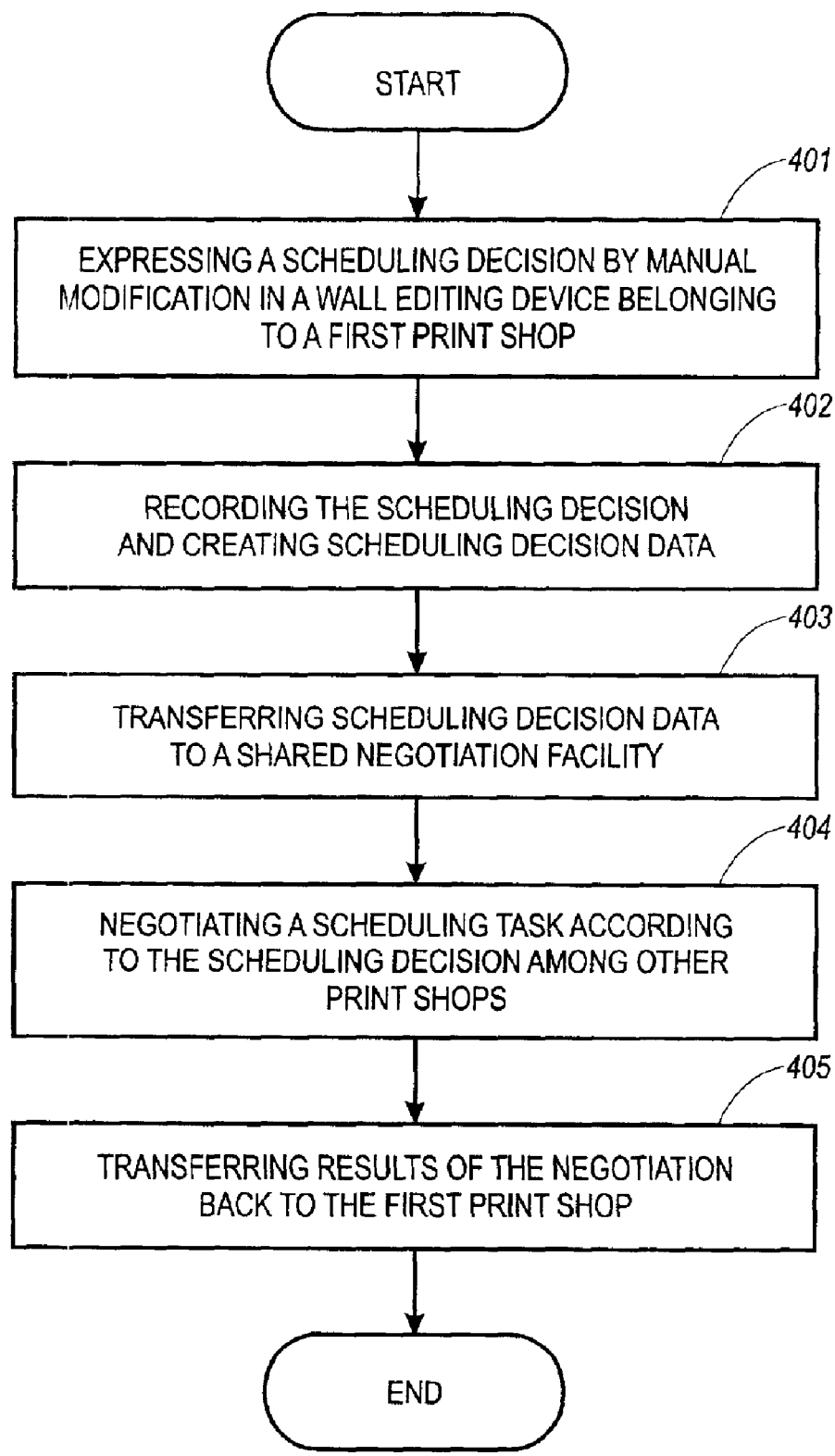
FIG. 4 illustrates a flow chart on how scheduling decisions are expressed and negotiations triggered according to the present invention.

With reference to FIG. 4, the interaction among the components of the architecture described above will be described in detail. In a first step 401, users 200 within a first printshop 101-1 use a scheduling board to manage their planning/scheduling activities in a printshop. When the decision-maker decides to insource a job from another printshop, using a free time slot, the decision-maker will delimitate it with an insource shape (e.g., rectangle 302) and put an insource mark on it (e.g., checkmark 306). In case it is decided to outsource a given task to another printshop, the decision-maker will put an outsource mark 308 on it.

In the following step 402 the scheduling decision is recorded and scheduling decision data which are used as negotiation information are created by the recorder facility. For this interaction between the scheduling board 201 and the recorder facility 202 there are at least three modalities, which are described in the following.

a) The recorder facility 202 is active all the time. It records the information displayed by the scheduling board 201 and reacts immediately to the actions of the decision-maker.
  b) The recorder facility 202 becomes active upon a decision-maker request. The scheduling board would contain a control region enabling the decision-maker to trigger the actions of the recorder facility. When the decision-maker puts an activation sign into the control region 204, the recorder facility 202 collects the information and sends them to the negotiation facility 103. When the decision-maker puts a stop sign into the control region 204, the recorder facility 202 stops recording.
  c) The recorder facility 202 records information displayed by the scheduling board 201 and from time to time sends this information to the negotiation facility 103 as an exploratory information.

In the first modalities, when the recorder facility 202 will be triggered, it will collect a number of time and technical information. If the decision-maker has selected a free time slot with an insource mark 306, the left end and the right end of the rectangle 302 will provide the earliest possible start time and the latest possible end, respectively, of the free time slot. This time information combined with the description of the machine technical capabilities will be the negotiation information sent to the negotiation facility.

On the other hand, if the decision-maker has selected a job (with a given identifier 304) by marking it with an outsource sign 308, then the left end and the right end of the rectangle corresponding to the ID job will provide the earliest possible start and the latest possible end time of the job to be performed. This time information combined with the description of the job technical requirements will be the negotiation information sent to the negotiation facility 103.

In the third modality, the recorder facility 202 will collect information about empty spaces and tasks that will be sent to the negotiation facility 103 for exploratory purposes. This transferring of scheduling decision data to the shared negotiation facility is shown in step 403. More specifically, this step involves searching the scheduling decision data to identify time slots with control marks (e.g., insource marks and outsource marks). Time slots with control marks are acted on; otherwise, time slots without control marks are ignored. Time slots that are acted on are published to the negotiation facility at step 403.

The next step 404 will be negotiating a scheduling task according to the scheduling decision. When the negotiation facility 103 receives the negotiation information from the recorder facility, it starts the corresponding negotiation with other printshops. A number of negotiation schemes among printshops can be adopted.

If it is an outsourcing request, the negotiation facility will start searching for a provider. If the decision-maker has also annotated the task with the name of a printshop, then the negotiation facility 103 could start the negotiation 404 with this printshop as a possible first provider.

If it is an in-sourcing request, the negotiation facility 103 will start searching for a customer. If the decision-maker has annotated the free time slot with the name of a printshop, then the negotiation facility 103 could start the negotiation 404 with this printshop as a possible first customer.

When the negotiation facility 103 receives exploratory information, it will not publish this information to the other printshops, but will use it to search for matching requests from other printshops.

The negotiation facility 103 will collect the answers for the outsourcing and in-sourcing request. In step 405 it will provide the negotiation's results, if any, back to the recorder facility 202 or to the scheduling board 201. The recorder facility 202 or the scheduling board 201 will show these negotiation results. One possibility, among others, for showing the negotiation results is that to list the solutions found in a menu, when the user selects the item associated to the negotiation. Moreover, the negotiation facility 103 will provide the results of these explorations, if the exploratory mode is allowed. Also, the decision-maker may want to stop some of the on-going negotiations because in the meanwhile, the decision-maker has found a solution for the allocation of some of the jobs and the time slots. In that case, the decision-maker could mark the jobs in the time slots for which the negotiation has to be stopped with an end mark and then put an end sign into the control region.

The respective insourced or outsourced print jobs will then, in accordance with the negotiation results, be transferred to or away from the first printshop in order to be processed.

Figure 5:
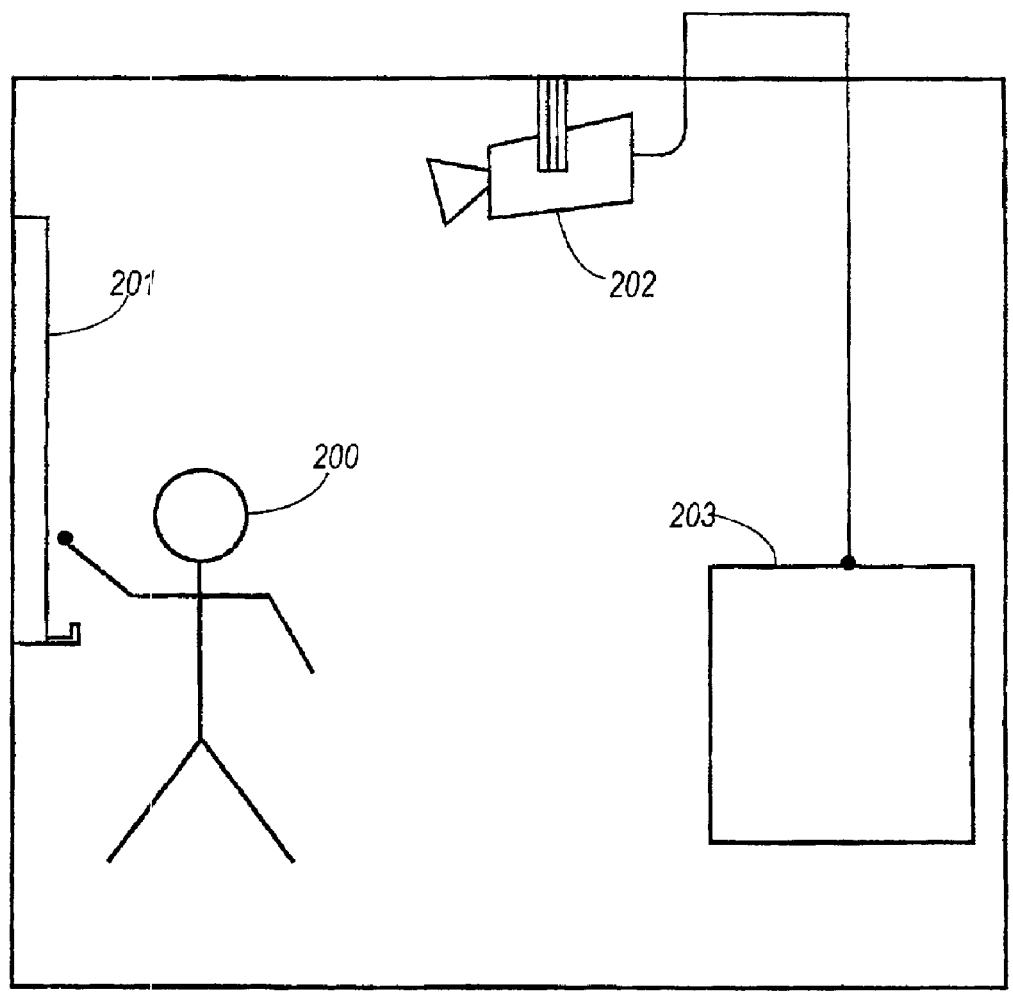
FIG. 5 illustrates a preferred embodiment of a scheduling board.

A specific example of a preferred embodiment of the present invention can be described in greater detail by referring to FIG. 5. Users will draw their schedules and control marks with a pen and/or by using magnets on a whiteboard. The schedules can also be expressed by means of a corkboard with pins and elastic bands or a velvet board with Velcro bands. The control region 204 could be a square delimited region at the left hand corner of the whiteboard, as shown in FIG. 2. A video camera serves as the recorder facility 202 and allows the user to identify a specific region to be recorded. Specific areas of the schedule starting/stopping negotiations corresponding to jobs and time slots in those specific areas can be elaborated and thus the decision-maker and collaborators can continue working on the rest of the schedule.

The negotiation facility 103 may provide the results of the negotiations (if any) to users and decision-makers on the whiteboard 201. A projector may project different colored lights on the work items for which negotiations or explorations succeeded.

According to a further exemplary implementation, the whiteboard functionality is simulated on large screen displays. Such a display provides basic pen-based scribbling and editing with pen-based gesturing and wiping techniques. It provides as well a scripting language to tailor domain objects to specific applications. This layer allows the bidirectional exchange of data between the whiteboard-like display and the actual application behind it. The domain objects are jobs and machines, and users will draw their schedules manipulating these objects through a graphical editor. The control region 204 can be a square delimited region at the left hand corner of the large screen display. The negotiation facility 103 may show the negotiation results to the users on the large screen display. For example, the screen could display colored rectangles in correspondence of the work items for which negotiations or explorations have succeeded. Multiple negotiations results could be displayed in a menu when selecting the item associated to the negotiation.

While the invention has been described with respect to the preferred physical embodiments constructed in accordance therewith, it will be apparent to those skilled in the art that various modifications, variations and improvements of the present invention may be made in light of the above teachings and within the purview of the appended claims without departing from the spirit and intended scope of the invention. In addition, those areas in which it is believed that those of ordinary skill in the art are familiar, have not been described therein in order not to obscure unnecessarily the invention described herein. Accordingly, it is to be understood that the invention is not to be limited by the specific illustrated embodiment, but only by the scope of the appended claims.

What is claimed is:

1. A method for mixed human and computer-supported distributed scheduling of a task according to scheduling decisions within a plurality of workplaces, said workplaces being connected to each other and to a shared negotiation facility via a computer network, the method comprising:

electronically recording a first scheduling decision manually expressed on a first scheduling board within a first of said workplaces and creating first scheduling decision data which represent the first scheduling decision in a computer-readable form;

electronically recording a second scheduling decision manually expressed on a second scheduling board within a second of said workplaces and creating second scheduling decision data which represent the second scheduling decision in a computer-readable form;

recognizing requests for task outsourcing manually expressed on the scheduling boards of said workplaces using a first shape and requests for task insourcing manually expressed on the scheduling boards of said workplaces using a second shape distinct from the first shape;

transferring the first scheduling decision data and the second scheduling decision data via the computer network to the shared negotiation facility;

negotiating said task within the shared negotiation facility by combining the first scheduling decision data with the second scheduling decision data received from at least said first of said workplaces and said second of said workplaces and creating negotiation result data which represent results of negotiating said task; and transferring said negotiation result data to at least said first and said second of said workplaces for indicating scheduling information specifying at least one of:

(i) in-sourcing said task to said first of said workplaces when the second scheduling decision indicates, using the first shape, a request for outsourcing and the first scheduling decision indicates, using the second shape, a free time slot for task in-sourcing that satisfies start time and completion time of the second scheduling decision; and (ii) outsourcing said task from said first of said workplaces when the first scheduling decision indicates, using the first shape, a request for task outsourcing and the second scheduling decision indicates, using the second shape, a free time slot for task-insourcing that satisfies start and completion time of the first scheduling decision.

2. The method according to claim 1, wherein recording said first scheduling decision manually expressed on the first scheduling board within a first of said workplaces further comprises recording on a manual board a schedule and a control mark representing the scheduling decision for task in-sourcing when the control mark has the first shape and task outsourcing when the control mark has the second shape.

3. The method according to claim 2, further comprising projecting said negotiation result data negotiated within the shared negotiation facility and transferred to said first of said workplaces using different colored lights onto the schedule expressed on the manual board.

4. The method according to claim 3, wherein said first of said workplaces and said second of said workplaces are printshops, respectively.

5. The method according to claim 3, wherein said task is a print job.

6. The method according to claim 1, wherein the first scheduling board is a large screen display.

7. The method according to claim 6, wherein the results of the negotiation are visualized on the large screen display.

8. The method according to claim 1, wherein said recording said first scheduling decision manually expressed on the first scheduling board located within said first of said workplaces further comprises:

recording at least a first time slot with a control mark and at least a second time slot without a control mark; and searching in the first scheduling decision data for time slots with control marks;

wherein said transferring the first scheduling decision data to the shared negotiation facility comprises transferring only time slots with control marks.

9. The method according to claim 2, further comprising:

recording a third scheduling decision manually expressed on a third scheduling board within a third of said workplaces and creating third scheduling decision data which represent the third scheduling decision in a computer-readable form; and identifying no control mark recorded in the third scheduling decision data; said identifying inhibiting transfer of the third scheduling decision data via the computer network to the shared negotiation facility.

10. The method according to claim 2, wherein scheduling decision data representing a scheduling decision manually expressed on a scheduling board within said workplaces is transferred via the computer network to the shared negotiation facility only if it contains a control mark.

11. The method according to claim 3, wherein said recording further comprises recording a digitized photograph of the manual board.

12. An apparatus for mixed human and computer supported distributed scheduling of tasks within a plurality of workplaces, comprising:

a first scheduling board located in a first of said workplaces and a second scheduling board located in a second of said workplaces;

recording devices located in at least the first and the second workplaces for electronically recording scheduling decisions and creating scheduling decision data which represent the scheduling decisions in a computer-readable form;

a shared negotiation facility for negotiating a scheduling task according to the scheduling decisions among said plurality of workplaces;

a computer network connecting said workplaces to each other and to the shared negotiation facility for transferring said scheduling decision data to said shared negotiation facility;

wherein said first and said second workplaces, said shared negotiation facility and said computer network operating together to:

electronically record a first scheduling decision manually expressed on a first scheduling board within a first of said workspaces and creating first scheduling decision data which represent the first scheduling decision in a computer-readable form;

electronically record a second scheduling decision manually expressed on a second scheduling board within a second of said workapaces and creating second scheduling decision data which represent the second scheduling decision in a computer-readable form;

recognize requests for task outsourcing manually expressed on the scheduling boards of said workplaces using a first shape and requests for task insourcing manually expressed on the scheduling boards of said workplaces using a second shape distinct from the first shape;

transfer the first scheduling decision data and the second scheduling decision data via the computer network to the shared negotiation facility;

negotiate said task within the shared negotiation facility by combining the first scheduling decision data with the second scheduling decision data received from at least said first of said workplaces and said second of said workplaces and creating negotiation result data which represent results of negotiating said task; and transfer said negotiation result data to at least said first and said second of said workplaces for indicating scheduling information specifying at least one of:

(i) in-sourcing said task to said first of said workplaces when the second scheduling decision indicates, using the first shape, a request for outsourcing and the first scheduling decision indicates, using the second shape, a free time slot for task in-sourcing that satisfies start time and completion time of the second scheduling decision; and (ii) outsourcing said task from said first of said workplaces when the first scheduling decision indicates, using the first shape, a request for task outsourcing and the second scheduling decision indicates, using the second shape, a free time slot for task-insourcing that satisfies start and completion time of the first scheduling decision.

13. The apparatus according to claim 12, wherein said first scheduling decision manually expressed on the first scheduling board within a first of said workplaces further comprises a manual board having recorded thereon a schedule and a control mark representing the scheduling decision for task in-sourcing when the control mark has the first shape and task outsourcing when the control mark has the second shape.

14. The apparatus according to claim 13, further comprising a projector for projecting said negotiation result data negotiated within the shared negotiation facility and transferred to said first of said workplaces using different colored lights onto the schedule expressed on the manual board.

15. The apparatus according to claim 14, wherein said first of said workplaces and said second of said workplaces are a first printshop and a second printshop, respectively.

16. The apparatus according to claim 15, wherein said first scheduling task comprises scheduling a task for a print job.

17. The apparatus according to claim 12, wherein the first scheduling board is a large screen display, on which the results of the negotiation are visualized.

18. The apparatus according to claim 12, wherein said first workplace operates to manually express said first scheduling decision on the first scheduling board located within said first of said workplaces by:

recording at least a first time slot with a control mark and at least a second time slot without a control mark; and searching in the first scheduling decision data for time slots with control marks wherein said transferring the first scheduling decision data to the shared negotiation facility comprises transferring only time slots with control marks.

19. The apparatus according to claim 13, wherein said first and said second workplaces, said shared negotiation facility, and said computer network operating together to:

record a third scheduling decision manually expressed on a third scheduling board within a third of said workplaces and create third scheduling decision data which represent the third scheduling decision in a computer-readable form; and inhibit transfer of the third scheduling decision data via the computer network to the shared negotiation facility when no control mark is identified recorded in the third scheduling decision data.

20. A method for mixed human and computer-supported distributed scheduling of a task according to scheduling decisions within a plurality of workplaces, said workplaces being connected to each other and to a shared negotiation facility via a computer network, the method comprising:

electronically recording a first scheduling decision and a second scheduling decision with at least one time slot with a control mark and at least one time slot without a control mark manually expressed on a first scheduling board within a first of said workplaces and a second scheduling board within a second of said workplaces, respectively;

recognizing requests for task outsourcing manually expressed on the scheduling boards of said workplaces using a first shape and requests for task insourcing manually expressed on the scheduling boards of said workplaces using a second shape distinct from the first shape;

creating first scheduling decision data and second scheduling decision data which represent the first scheduling decision and the second scheduling decision data, respectively, in a computer-readable form;

searching in the first scheduling decision data and the second scheduling decision data for time slots with control marks;

transferring in-source and outsource time slots with control marks in the first scheduling decision data and the second scheduling decision data via the computer network to the shared negotiation facility;

negotiating said task within the shared negotiation facility by combining the first scheduling decision data with the second scheduling decision data received from at least said first of said workplaces and said second of said workplaces and creating negotiation result data which represent results of negotiating said task; and transferring said negotiation result data to at least said first and said second of said workplaces for indicating scheduling information specifying at least one of:

(i) in-sourcing said task to said first of said workplaces when the second scheduling decision indicates, using the first shape, a request for outsourcing and the first scheduling decision indicates, using the second shape, a free time slot for task in-sourcing that satisfies start time and completion time of the second scheduling decision; and (ii) outsourcing said task from said first of said workplaces when the first scheduling decision indicates, using the first shape, a request for task outsourcing and the second scheduling decision indicates, using the second shape, a free time slot for task-insourcing that satisfies start and completion time of the first scheduling decision.

* * * * *